United States Patent [19]
Ballweber et al.

[11] 3,928,448
[45] Dec. 23, 1975

[54] DICHLOROBUTENE/DIMETHYLAMINE IONENE POLYMER

[75] Inventors: Edward G. Ballweber, Glenwood; Wun Ten Tai, Palos Hills; Radhakrishnan Selvarajan, Chicago, all of Ill.

[73] Assignee: Nalco Chemical Company, Oak Brook, Ill.

[22] Filed: July 15, 1974

[21] Appl. No.: 488,644

[52] U.S. Cl. .................. 260/567.6 P; 260/29.6 R; 260/87.5 R; 260/89.7 N; 260/89.7 S; 260/91.7; 210/54
[51] Int. Cl.² ............... C07C 85/00; C07C 87/30; C08F 214/00; C02B 1/20
[58] Field of Search ......... 260/91.7, 89.7 N, 89.7 S, 260/87.5 R, 567.6 M, 567.6 P

[56] References Cited
UNITED STATES PATENTS

| | | | |
|---|---|---|---|
| 2,946,757 | 7/1960 | Butler | 260/567.6 P |
| 3,349,032 | 10/1967 | Krieg | 260/567.6 P |
| 3,629,161 | 12/1971 | Paine et al. | 260/2 R X |
| 3,632,507 | 1/1972 | Dover | 260/2 R X |
| 3,778,476 | 12/1973 | Rembaum et al. | 260/567.6 P |
| 3,784,529 | 1/1974 | Bayer et al. | 260/79.3 |
| 3,825,511 | 7/1974 | Markhart et al. | 260/87.5 R |
| 3,887,751 | 6/1975 | Markhart et al. | 428/342 |

OTHER PUBLICATIONS

"Recent Advances in Ion-containing Polymers", M. F. Hoover et al., 1974.
Journal of Polymer Science Symposia "Ion Containing Polymers, "E. S. Eisenberg.

Primary Examiner—Joseph L. Schofer
Assistant Examiner—Herbert J. Lilling
Attorney, Agent, or Firm—John G. Premo; Barry W. Sufrin

[57] ABSTRACT

Novel trans-1,4-dichloro-2-butene-dimethylamine ionene chloride polymers are prepared and used in water clarification applications, as an emulsion breaker, sludge dewatering and drainage aid, as a flocculant in treating water and as coagulants in sewage and waste stream applications.

5 Claims, No Drawings

DICHLOROBUTENE/DIMETHYLAMINE IONENE POLYMER

This invention relates to a novel trans-1,4-dichloro-2-butenedimethylamine ionene chloride polymer and its reaction products with multifunctional mono-or polyamines. The novel polymer of this invention has repeating units with the formula:

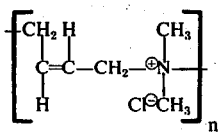

and its further reaction products with multi-functional polyamines:

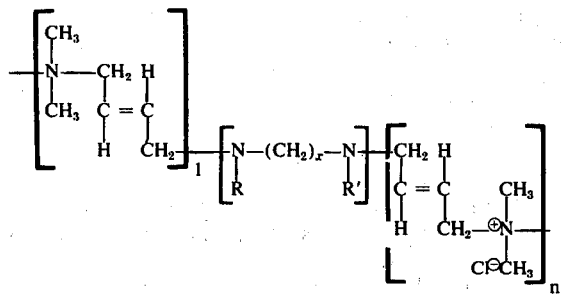

$n$ sufficiently large to give a polymer with an intrinsic viscosity in the range of 0.04 to 0.85 and
$l, m > 1$
$x = 0$ or $> 1$

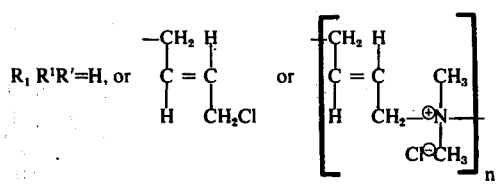

OBJECTS

It is therefore an object of this invention to provide a trans-1,4-dichloro-2-butene-dimethylamine ionene chloride polymer having repeating units with the structure:

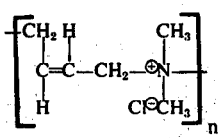

and its further reaction products with multi-functional polyamines:

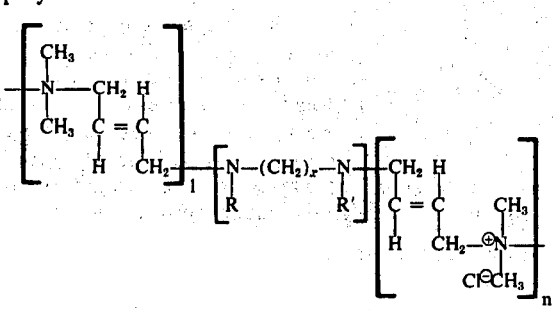

$n$ sufficiently large to give a polymer with an intrinsic viscosity in the range 0.04 to 0.85 and
$l, m > 1$
$x = 0$ or $> 1$

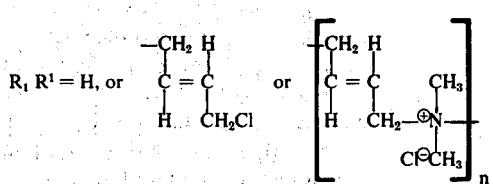

It is also an object of this invention to provide a trans-1,4-dichloro-2-butene-dimethylamine ionene chloride polymer which is useful in water clarification applications, especially in emulsion breaking, sludge drainage and dewatering, and in clarifying municipal and industrial sewage and waste streams.

THE INVENTION

The novel trans-1,4-dichloro-2-butene-dimethylamine ionene chloride polymer of this invention has repeating units with the formula:

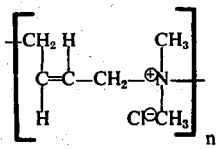

and its further reaction products with multi-functional polyamines:

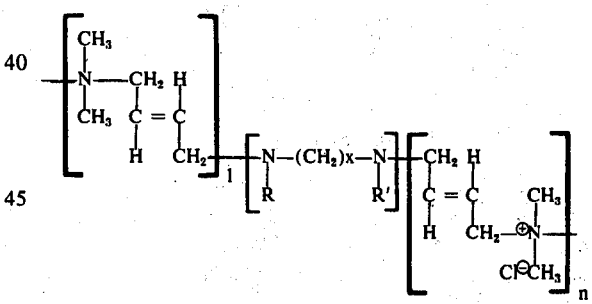

$n$ sufficiently large to give a polymer with an intrinsic viscosity in the range of 0.04 to 0.85 and
$l, m > 1$
$x = 0$ or $> 1$

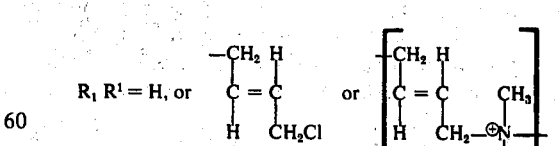
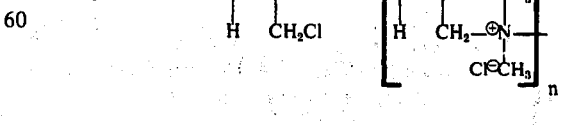

The trans-1,4-dichloro-2-butene-dimethylamine ionene chloride polymer is formed by reacting dimethylamine and trans-1,4-dichloro-2-butene while maintaining the pH below 11, and at a temperature between 45°–50°C. The molar ratio of trans-1,4-dichloro-2- butene to dimethylamine typically will range between 5:1 to 1:5, but is typically 1:1. However, the ratio of these two constituents may fall outside this range, and indeed provide a polymer with acceptable application characteristics.

It has been determined that the polymer described above can be cross-linked with ethylenediamine to provide polymers with even higher activity and intrinsic viscosity. The formula weight ratio of polymer to ethylene diamine is between 20:1 to 100:1. These higher intrinsic viscosity ionenes are more active in water clarification and other applications than lower molecular weight ionene polymers prepared without cross-linking agents.

Typically, the method of producing these polymers involves adding the amines to the trans 1,4-dichloro-2-butene, followed by the addition of an aqueous solution of sodium hydroxide which is slowly added at a temperature within the range of 30°–45°C, maintaining the pH of the polymer solution at between 9.5 and 10.5. The novel polymers of this invention have intrinsic viscosities within the range 0.04 to 0.85.

As mentioned above, the concentrations and reaction ranges listed are only typical ranges and not intended to limit the polymers of this invention. In order to produce polymers having higher intrinsic viscosity, within the range of 0.6 to 0.75, it has been found that such polymers can be obtained by adjusting any of the following parameters:

A. increase the concentration of dimethylamine;
B. reduce the reaction temperature;
C. maintain a lower pH of the reaction during the sodium hydroxide solution addition by using either a more dilute sodium hydroxide solution and a longer sodium hydroxide solution addition time;
D. a slightly less than theoretical quantity of sodium hydroxide; and
E. use cross-linking agents.

In order to further describe the novel composition of this invention, the following examples are provided, but it should be understood that these examples are not intended to limit the invention.

EXAMPLE 1

Preparation of trans-1,4-dichloro-2-butene-dimethylamine ionene chloride: 75 grams of trans-1,4-dichloro-2-butene (0.60m) was placed into a 500 milliliter resin flask fitted with a stirrer, dry ice condenser, pH meter, thermometer, and addition funnel. With stirring, 69.3 grams of a 39% solution of dimethylamine was added dropwise over a period of 36 minutes at 45°–50°C at a pH below 11. After the addition, stirring was continued for an additional 10 minutes at which time the pH was decreased to about 7.

Forty-eight grams of an aqueous sodium hydroxide solution (50%) was then added dropwise at a pH of about 10 while maintaining the temperature at 40°C to provide a polymer solution with the following characteristics:
  intrinsic viscosity = 0.25
  Brookfield viscosity of 25% polymer solution (calculated without chloride ion) = 150 CPS)

EXAMPLE 2

Dimethylamine (15.5%), 145 grams, was added dropwise with stirring to 62.5 grams of trans-1,4-dichloro-2-butene over a period of 30 minutes at 30°C and at a pH below 11. After the addition stirring was continued for 10 minutes.

Sodium hydroxide (33.3%), 60 grams, was then added over a period of 140 minutes at about 45°C and at a pH below 11. The polymer, rendered acidic (pH 4.0) with hydrochloric acid (5 g.), gave a polymer solution with an intrinsic viscosity of 0.11.

EXAMPLE 3

It has been found that lower intrinsic viscosity polymers could be also prepared by heating higher intrinsic viscosity polymers at elevated temperatures (preferably at 60°–70°C) and alkaline pH (preferably at 7–9).

A dichloro butene dimethylamine ionene solution having intrinsic viscosity of 0.25 and a polymer concentration of 35.1% was heated at 60°C at a pH of 10 ± 0.5 for 7.5 hours, at the end of which time the intrinsic viscosity of the polymer solution was 0.04.

This degradation process could be accelerated greatly when conducted at a higher temperature. Even at ambient temperature and in alkaline pH a very slow degradation is observed over an extended period of time. For this reason polymer solutions are usually acidified to acidic pH (4–6) after the reaction.

EXAMPLE 4

Dimethylamine (39%), 173 grams, was added dropwise to 187.5 grams of trans-1,4-dichloro-2-butene at 30°–35°C over a period of 60 minutes. After the addition stirring was continued for 10 minutes.

Aqueous sodium hydroxide (28.37%), 211.5 grams, was then added at 44 ± 1°C at a pH below 10.0. After the caustic addition the polymer solution was kept at 45°C for an additional 10 minutes, and then diluted with 220.8 grams of deionized water and acidified with 8.0 grams of concentrated hydrochloric acid to a pH of 5–6. The polymer prepared had an intrinsic viscosity of 0.12.

EXAMPLE 5

62.5 Grams of the trans-1,4-dichloro-2-butene (0.5 moles) was added to a 4 necked reaction flask fitted with a pH meter, stirrer, thermometer, and an addition funnel. A mixture of 0.18 grams of ethylene diamine (0.033 moles) and 36.6 grams of a 60% solution of dimethylamine (0.488 moles) was slowly added over a 60 minute period to the trans-1,4-dichloro-2-butene with stirring. The reaction flask was cooled with an ice bath and the temperature was maintained throughout the amine addition at 15 ± 2°C. The maximum pH during the amine addition was kept below 11.0. Upon continued stirring at 20°C for 45 minutes more, the pH of the solution dropped to 7.0. Then 38 grams of a 50% aqueous solution of sodium hydroxide was added very slowly, maintaining the pH below 10.0, and the temperature of approximately 20°C, so as to avoid the initial violent exotherm. After the addition of half of the caustic, the reaction temperature was allowed to rise up to about 40°C. After 32 grams of the sodium hydroxide was added, in order to facilitate the fluidity, 10 grams of deionized water was added. Then the caustic addition was continued and upon completion the pH was 10.2. Since the reaction mixture could no longer be stirred, it was left standing for 30 minutes and a drop in pH to 8.5 was noted. 185 grams of deionized water was added and the mixture was kept stirred for 30 minutes to form a solution. 1.5 grams of concentrated hydrochloric acid was added to render the solution acidic at a pH of 3.0. The polymer had an intrinsic viscosity of 0.75.

The polymers formed in the examples above and other products coming within the scope of the invention have properties which make them useful for breaking oil-in-water emulsions and for coagulating and settling various types of suspended matters in water treatment, sewage treatment, treatment of waste water and paper making.

A standard Kaolin test established as an acceptable simulation of waste water containing solid matter to be separated, was run with each of the polymers prepared in the Examples. The activity number is measured as a ratio of the dose of sample required to reach a turbidity of 10 JTU's divided by the dose of the standard required to reach a turbidity of 10 JTU's. Any time that this ratio is less than 1, the polymer is deemed to be acceptable. The results of the Kaolin test are shown in Table I.

TABLE I

| Example No. | Turbidity Value |
|---|---|
| 1 | 0.87 |
| 5 | 0.75 |

We claim:
1. A trans-1,4-dichloro-2-butene-dimethylamine ionene chloride polymer with repeating units represented by the formula:

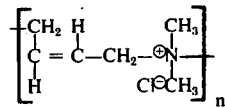

where $n$ is sufficiently large to give a polymer with an intrinsic viscosity in the range of 0.04 to 0.85.

2. A trans-1,4-dichloro-2-butene-dimethylamine ionene chloride polymer of claim 1 wherein said polymer is cross-linked with ethylene diamine wherein the formula weight ratio of said polymer to said ethylene diamine is between 20:1 to 100:1.

3. A solution of the composition of claim 1 in water.
4. A solution of a composition of claim 2 in water.
5. A method of water treatment to remove solids comprising treating said liquid with: trans-1,4-dichloro-2-butene-dimethylamine ionene chloride.

* * * * *